United States Patent

Warner et al.

[11] 4,108,012
[45] Aug. 22, 1978

[54] POWER TRANSMISSION BELT

[75] Inventors: John Craig Warner, Ithaca, N.Y.; Mark William Gravel, Keokuk, Iowa

[73] Assignee: Borg-Warner Corporation, Chicago, Ill.

[21] Appl. No.: 749,495

[22] Filed: Dec. 10, 1976

[51] Int. Cl.² ............................ F16G 1/28; F16G 5/00
[52] U.S. Cl. ..................................... 74/231 C; 74/234
[58] Field of Search .............................. 74/231 C, 234

[56] References Cited

U.S. PATENT DOCUMENTS

| 3,772,929 | 11/1973 | Redmond, Jr. | 74/231 C |
| 3,835,720 | 9/1974 | Fisher et al. | 74/231 C |
| 3,964,328 | 6/1976 | Redmond | 74/231 C |
| 4,002,082 | 1/1977 | Waugh | 74/231 C |

FOREIGN PATENT DOCUMENTS 2,249,488  4/1973  Fed. Rep. of Germany ........ 74/231 C Primary Examiner—Leonard H. Gerin
Attorney, Agent, or Firm—Aubrey L. Burgess

[57] ABSTRACT

A power transmission belt comprising an elastomeric body and longitudinally spaced, lateral stiffening members extending substantially the width of the body. The stiffening members may be of multiple piece construction and joined to a longitudinal reinforcing tension member in the body of the belt. Additional edge pads may be attached to the stiffeners at the edges of the belt. The belt of this construction is especially adaptable for use to transmit power in variable pulley drives and the like.

5 Claims, 5 Drawing Figures

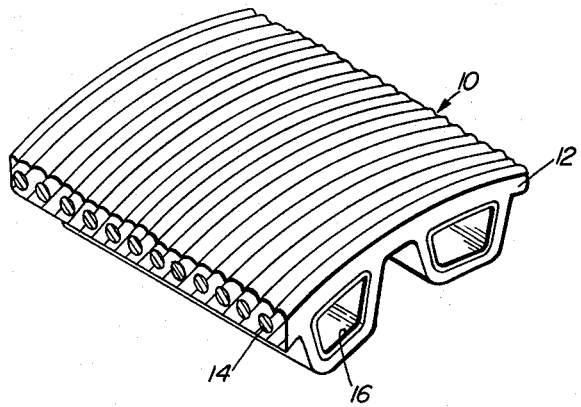
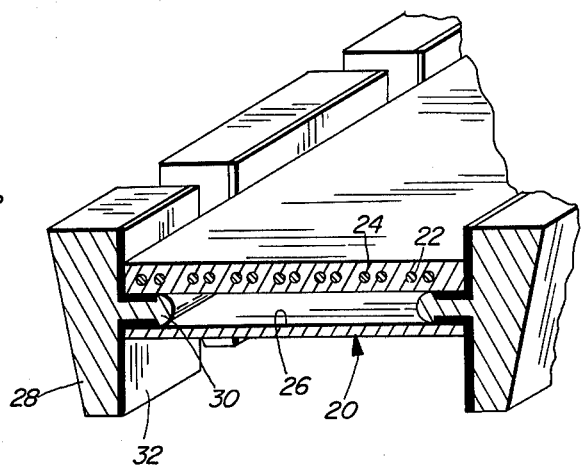
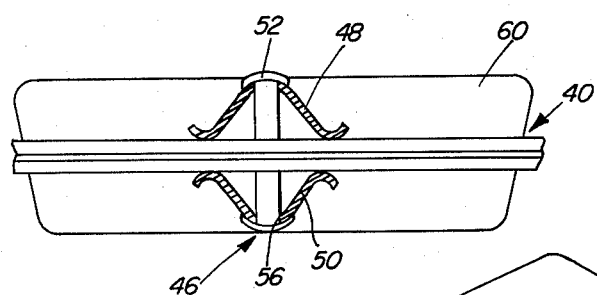
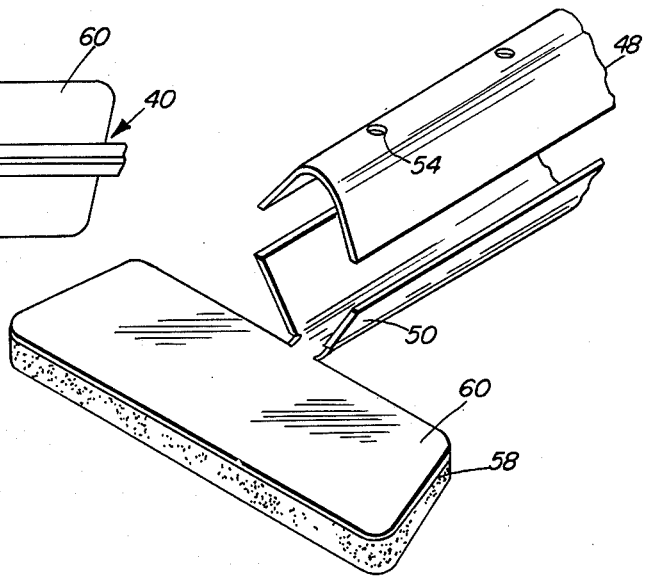
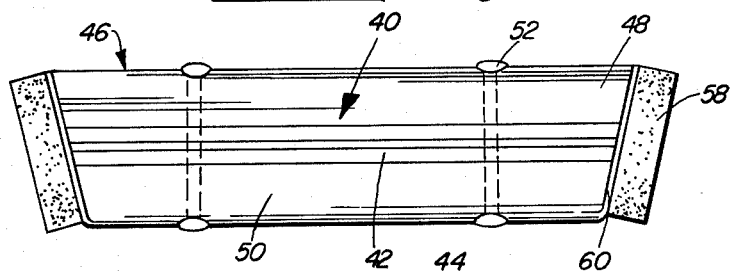

POWER TRANSMISSION BELT

BACKGROUND OF THE INVENTION

Power transmission belts comprising an elastomeric body reinforced with one or more helical winds of a cord which functions as a tension member such as fiberglass strand, are well known in the art. Some belts also include lateral members to provide lateral stiffness to the belt while permitting longitudinal flexibility thereof when used to transmit power especially in variable pulley drives in which the belt performs its power transmission function by engaging the pulley flanges with its edges. In the absence of the stiffeners, belts sag, become arched and distorted. This is undesirable and is to be avoided. Examples of belts with lateral stiffening are described in U.S. patents to Unger and Redmond U.S. Pat. Nos. 2,189,049 and 3,772,929, respectively.

THE INVENTION

The power transmission belt according to this invention comprises an elastomer body, such as rubber, synthetic rubber and the like with a longitudinal tension member comprising, for example, a helical wind of a cord and the like incorporated therein and, also laterally positioned stiffening members. The stiffening members may be tubular or non-tubular and of multiple piece construction which are joined to the elastomer body. Edge pads may be used which are associated with the stiffening members.

THE DRAWINGS

FIG. 1 is a partial view of a power transmission belt constructed according to this invention;

FIG. 2 is a new similar to FIG. 1 illustrating another embodiment of the invention; and FIGS. 3, 4 and 5 illustrate still another embodiment of the invention.

DETAILED DESCRIPTION

Looking now at FIG. 1 of the drawings, there is illustrated a power transmission belt 10 which comprises an elastomeric body 12, such as rubber, synthetic rubber and the like, having a longitudinally extending tension member, and reinforcing means, such as cord or wires 14 embedded therein, and longitudinally spaced stiffeners 16, also embedded therein. The cord 14 may be a helical wind of glass fibers or metal wires, and the like, and may be joined to the stiffeners 16. The latter are preferably hollow and constructed of metal, plastic and the like.

The belt is cogged, as illustrated, or flat or have other surface configurations. One or both upper and lower surfaces may be covered with a cloth, such as nylon, as is conventional in the belt art.

The belt 20 of FIG. 2 may be of a basic construction similar to that of FIG. 1, namely, an elastomeric body 22 with a longitudinally extending tension and reinforcing member, such as cord or wire 24, and longitudinally spaced hollow lateral stiffeners 26. In addition, there are edge pads 28 spaced along the length of the belt 20 at the edges thereof which are connected to the belt by projecting members or portions 30 received in the stiffeners 26. The pads 28 may be of an elastomeric material, friction material-faced material and the like can be bonded to metal plates 32, as is illustrated, and can be of a stiffness the same or differing from that of the belt body 22. Also, the pads 28 may be of metal when used in oil.

The belt 40 of FIGS. 3 and 4 comprises an elastomeric body having a longitudinally extending tension and reinforcing member 44 therein, which is illustrated as a metal or plastic band, mesh or a plurality of cords, and longitudinally spaced, lateral stiffeners 46. Each stiffener 46 is constructed of a top part 48 and a bottom part 50 joined together and to the tension and reinforcing member 44 by one or more rivets, bolts and the like 52, the latter passing through suitable holes 54, 56 in the stiffeners 46 and the reinforcing member 44, respectively. Other methods of attaching the stiffening members, i.e., the use of glue, screws, rivets and the like are considered to be within the scope of this invention. Edge pads 58 similar to those of the FIG. 2 embodiment are preferably attached to the bottom part 50 so as to flank the edges of the belt 40; these pads may be of a stiffness similar to or differing from that of the body of the belt; may be segmented, so as to be longitudinally flexible.

Preferably the top and bottom parts 48 and 50, respectively, have smoothly curved side wing-like portions so as to avoid local bending stresses, especially when the tension member 44 is a metal member. These stiffeners can be stamped metal, cast or forged metal, molded plastic and the like within the scope of this invention.

A conventional timing belt having a plurality of teeth may be converted to a belt having lateral stiffness by clamping or attaching stiffeners such as stiffeners 46 to the belt. In such case, the bottom part 50 may be contoured to press primarily on a tooth rather than through a thinner section of the belt.

We claim:

1. A power transmission belt comprising an elastomeric body, reinforcing tension means in said body, laterally positioned hollow stiffening members of multiple piece construction in said body and connected to said reinforcing tension means, said stiffening member being longitudinally spaced and extending substantially the width of said elastomeric body.

2. A power transmission belt comprising an elastomeric body, reinforcing tension means in said body, laterally positioned stiffening members of multiple piece construction in said body and connected to said reinforcing tension means, each stiffening member being constructed of a top part and a bottom part, each part having curved wing-like side portions engaging said belt, said stiffening members being longitudinally spaced and extending substantially the width of said elastomeric body.

3. A power transmission belt comprising an elastomeric body, laterally positioned tubular stiffening members in said body which members are longituindally spaced and extend substantially the width of said body, and a plurality of edge pads positioned at the edges of said body, said edge pads being connected to said tubular stiffening members.

4. A power transmission belt as recited in claim 3, further comprising rigid supports for said pads, each pad having a projecting portion extending into said tubular members forming the connection thereto.

5. A power transmission belt especially adapted for use in power transmission in a variable pulley drive, said belt comprising an elastomeric body, a tension and reinforcing member in said body and extending throughout the length thereof; and longitudinally spaced edge pads connected to the edges of said body especially adaptable to engage the flanges of said variable pulleys.

* * * * *